United States Patent

[11] 3,597,579

| [72] | Inventor | Robert Miller Lumley<br>Greensboro, N.C. |
|---|---|---|
| [21] | Appl. No | 49,588 |
| [22] | Filed | June 25, 1970 |
| [45] | Patented | Aug. 3, 1971 |
| [73] | Assignee | Western Electric Company, Incorporated<br>New York, N.Y. |

[54] METHOD OF TRIMMING CAPACITORS
10 Claims, 6 Drawing Figs.

[52] U.S. Cl........................................................ 219/121 L,
219/121 LB
[51] Int. Cl........................................................ B23k 9/00

[50] Field of Search............................................ 219/121 L,
121 EB; 320/1; 317/242, 260

[56] References Cited
UNITED STATES PATENTS
2,769,889  11/1956  Dubilier ........................ 317/242 X

*Primary Examiner*—J. V. Truhe
*Assistant Examiner*—Lawrence A. Rouse
*Attorneys*—W. M. Kain, R. P. Miller and R. C. Winter ABSTRACT: A method of trimming a capacitor wherein radiant energy is applied to an electrode to adjust the electrode area while an electrical potential is applied across the electrodes of the capacitor to inhibit the formation of electrical shorts.

INVENTOR
R. M. LUMLEY
By W. L. Williamson
ATTORNEY

PATENTED AUG 3 1971 3,597,579

METHOD OF TRIMMING CAPACITORS

BACKGROUND OF THE INVENTION

In the manufacture of large numbers of capacitors, it is extremely difficult, if not impossible, to control all of the necessary parameters with sufficient accuracy to obtain the required capacitance value for each capacitor manufactured. This is particularly true when high-precision capacitors are required. As a result, it is either necessary to discard large numbers of capacitors because they do not meet specified tolerances or to trim the capacitors to value.

As will be appreciated, a capacitor can only be trimmed by adjusting the electrode spacing and/or the effective electrode area. It is not possible to adjust the dielectric permittivity after the capacitor has been manufactured as this is an inherent property of the dielectric. With some capacitors, such as polystyrene-wound capacitors, it is possible to adjust the electrode spacing by heat treating the capacitors, see for example U.S. Pat. No. 3,342,654. However, when relatively small capacitance values are involved, it is difficult, if not impossible, to control the heat treatment of the capacitors with sufficient accuracy to obtain the required trimming. With other capacitors, such as thin-film capacitors or Mylar (trademark) wound capacitors, it is not possible to adjust the electrode spacing after the capacitors have been manufactured. Accordingly, it would be highly desirable if the effective electrode area could be accurately adjusted to trim capacitors to their required capacitance.

It is known in the prior art that radiant energy can be used to selectively remove controlled amounts of material. For example, lasers have been effectively used to trim resistors with a high degree of precision, see "Laser Beam Trim Resistors," ELECTRONICS, Feb. 21, 1964, pages 46—47. However, the trimming of capacitors using radiant energy has not been possible heretofore because during removal of selected portions of an electrode to adjust the effective electrode area, the electrodes are welded or fused together to create a direct short across the capacitor.

For example, in U.S. Pat. No. 3,360,398, it is taught that capacitors can be trimmed using an electron beam. However, in this patent it is noted that the vaporized electrode material is redeposited to short the electrodes. This difficulty is overcome in the patent by applying a stream of oxygen to the capacitor during trimming to oxidize the redeposited material thereby rendering it nonconductive. As will be appreciated, this technique can only succeed where (1) the electrode material can be oxidized, e.g., it would not work with gold, (2) the oxide of the electrode material is sufficiently nonconductive to effectively reduce leakage current across the capacitor, (3) the electrode material can be oxidized without damage to the dielectric, and (4) the electrode material being removed is at the surface of the capacitor and can, therefore, be exposed to the oxygen, e.g., it would not work with a wound capacitor where several layers were being removed, Also, it has been found that redeposition of vaporized material is not the primary problem but rather the welding or fusing of the electrodes during trimming.

It is also known in the prior art that shorts in a capacitor can be cleared by applying sufficient electrical potential or voltage across the capacitor to "burn out" any conducting paths, i.e., shorts, between the capacitor electrodes, see for example U.S. Pat. No. 2,769,889. Unfortunately, it has not been possible to clear shorts formed by radiant energy trimming in this manner as the voltage and/or current levels required to clear the welded or fused area results in total capacitor failure. In other words, at the voltage and/or current levels required, the dielectric may break down, and/or the dielectric may vaporize, and/or the electrodes may be burned, and/or the electrodes may melt, etc.

What is needed in the industry, and what is contemplated by this invention, is a method of trimming a capacitor with radiant energy without electrical shorts being formed.

It is, therefore, an object of this invention to provide a method of trimming a capacitor using radiant energy.

Another object of this invention is to provide a method of trimming a capacitor using radiant energy while inhibiting the formation of electrical shorts.

SUMMARY OF THE INVENTION

With these and other objects in view, this invention contemplates providing a method of trimming a capacitor which includes the steps of (1) applying radiant energy to an electrode of the capacitor to adjust the effective electrode area and (2) applying an electrical potential across the capacitor while the radiant energy is applied thereto to inhibit the formation of electrical shorts.

DETAILED DESCRIPTION

Figure 1:
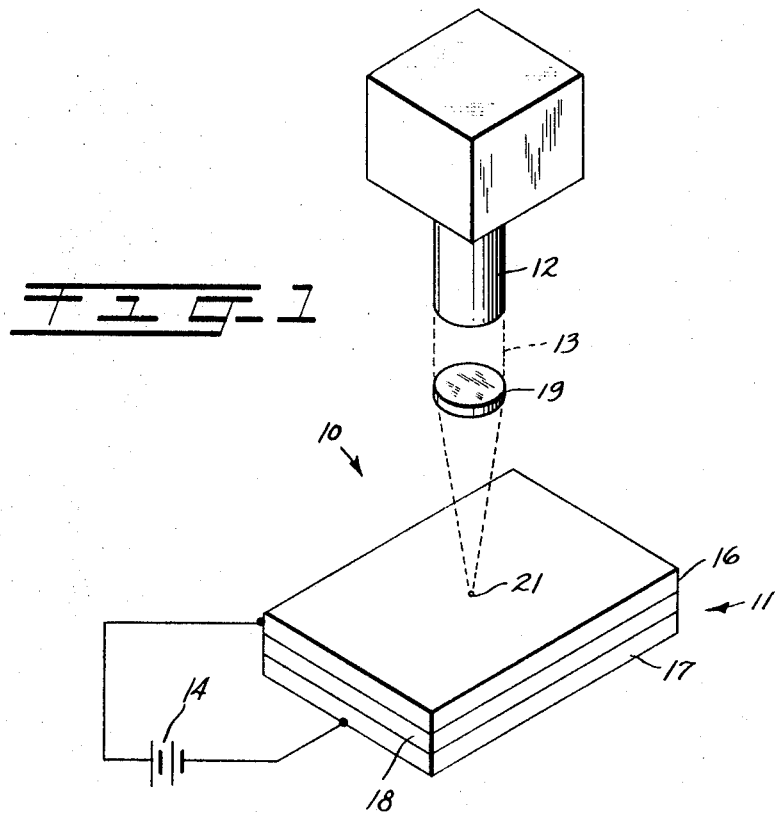
FIG. 1 is a schematic illustration of an apparatus suitable for trimming a capacitor according to the method of the invention.

In FIG. 1, a schematic of an apparatus 10 suitable for trimming a capacitor 11 is illustrated. The apparatus 10 includes a device 12 such as a laser for generating a beam 13 of radiant energy and a power supply 14 for applying a suitable voltage to electrodes 16 and 17 and, therefore, across dielectric 18. Any suitable focusing element 19 such as a lens may be employed to shape the beam 13 into a desired configuration and/or to adjust the size of the beam so that a desired portion of the electrode 16 is removed to adjust the effective electrode area of the capacitor.

The method of this invention includes the steps of (1) applying radiant energy to an electrode of the capacitor to adjust the effective electrode area and (2) applying an electrical potential or voltage across the capacitor while the radiant energy is applied thereto to inhibit the formation of electrical shorts.

The step of applying radiant energy to the electrode 16 to adjust the effective electrode area can be accomplished, for example, by focusing the beam to a desired spot size 21. In this manner, a controlled area of the electrode 16 may be vaporized to adjust the effective electrode area by an amount required to trim the capacitor to a desired value.

Figure 2:
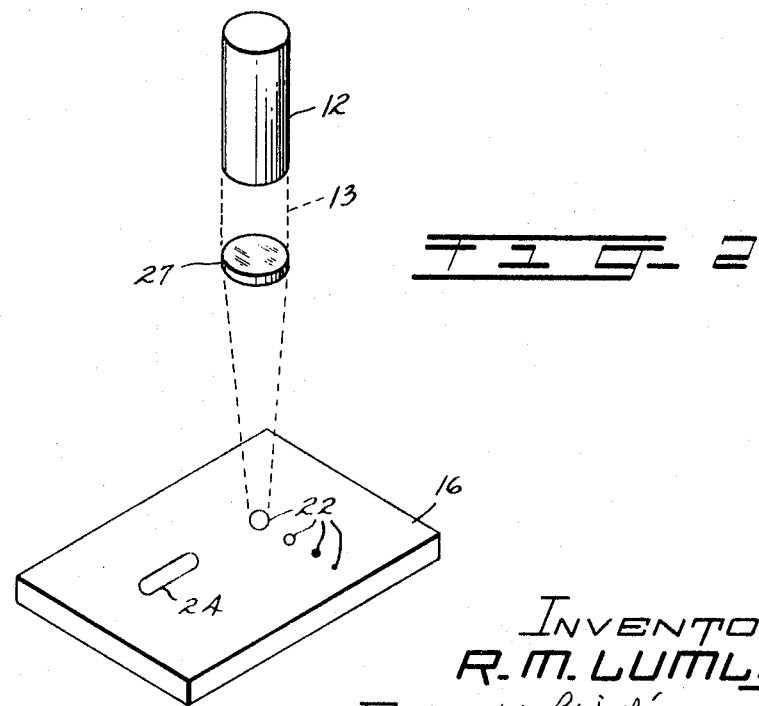
FIGS. 2—4 are plane views of typical electrodes showing a representative group of trimming patterns which may be employed in practicing the invention.
Figure 3:
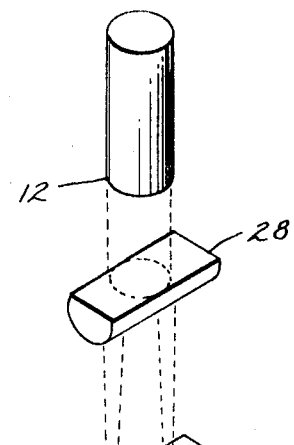
Figure 4:
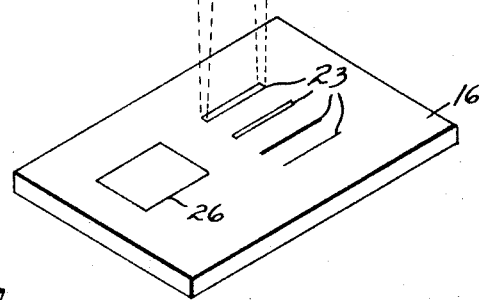

Referring now to FIGS. 2—4, the effective electrode area may be adjusted by the beam 13 in any one of a number of ways. For example, depending upon the change in effective electrode area required to achieve a desired capacitance, the beam 13 may be focused to a spot, a line or a perimeter-type pattern.

If the capacitor is to be trimmed by focusing the beam 13 to a spot 22 (FIG. 2), the diameter of the spot 22 may be adjusted by defocusing the beam 13. In this manner, the amount of material removed by the beam 13 may be readily controlled merely by controlling the diameter of the spot 22. Also, if the capacitor is to be trimmed by focusing the beam 13 to a line 23 (FIG. 3), the width of the line 23 may also be adjusted by defocusing the beam 13. This also permits the amount of material removed by the beam 13 to be readily controlled merely by controlling the width of the line 23.

However, the maximum diameter of the spot 22 and the maximum width of the line 23 is limited by the power output of the device 12. As will be appreciated, a certain power density, i.e., watts-per-unit area, is required to vaporize a given material. If the beam 13 is defocused to such an extent that the power density drops below that which is required to vaporize the particular electrode material, then it is not possible to trim the capacitor at that spot diameter or line width. Accordingly, in some situations, it may be desirable or even necessary to apply the beam 13 to electrode 16 at spaced intervals to remove discrete areas of the electrode. In this manner, the cumulative effect of removing a plurality of even relatively small portions of the electrode 16 will change the effective electrode area by an amount sufficient to trim the capacitor to value. Also, the spot 22 or line 23 may be displaced relative to the electrode 16 to remove a relatively large area 24 (FIG. 2) and 26 (FIG. 3) respectively from electrode 16. In this manner, the capacitor can be trimmed by controlling the distance across the electrode the beam 13 travels. As will be appreciated, a spherical lens 27 (FIG. 2) may be employed to focus beam 13 to a spot and a cylindrical lens 28 (FIG. 3) may be employed to focus beam 13 to a line.

In addition, the beam 13 may be displaced relative to the electrode 16 so as to electrically isolate a portion of the electrode. For example, the beam 13 could be displaced across electrode 16 to remove material along line 33 (FIG. 4) thereby electrically isolating corner 34 from the rest of the electrode or along line 36 (FIG. 4) thereby electrically isolating end 37 from the electrode. Also, the beam 13 can be displaced to define a perimeter-type pattern such as pattern 38 or pattern 39 (FIG. 4) to electrically isolate the portion of electrode 16 falling within the pattern from the rest of the electrode 16. In this manner, it is possible to effect relatively large changes in the effective electrode area of the capacitor without actually removing large areas of the electrode.

The perimeter-type pattern, for example, pattern 38 may also be formed without displacing the beam 13 relative to the electrode. This may be accomplished by employing a plurality of cylindrical lens segments to generate a series of lines which are joined together to form a geometric figure such as a square or a rectangle. A composite cylindrical lens of may type disclosed in U.S. application Ser. No. 664,747, filed Aug. 31, 1967, now U.S. Pat. No. 3,534,462, and assigned to Western Electric Company, Inc., may be advantageously employed to focus beam 13 into a desired perimeter-type pattern. A circular perimeter-type pattern may also be formed using an Axicon conical lens. The size of the pattern may be adjusted to accurately control the area to be electrically isolated or the pattern may be applied at discrete locations on the electrode 16 to cumulatively isolate the desired area.

As will be appreciated, any suitable facility may be employed to displace the laser beam 13 relative to the electrode 16. For example, the capacitor to be trimmed may be placed on a conventional X, Y table (not shown) and the table used to displace the capacitor beneath the laser beam as required.

The step of applying an electrical potential or voltage across the capacitor while applying the radiant energy thereto can be accomplished, for example, by connecting any suitable AC or DC voltage source across the capacitor. It should be noted that it is not essential for the voltage to be applied simultaneously with the radiant energy. It is only necessary that the voltage be applied while the radiant energy is applied.

The voltage can be applied to the capacitor 11 while the radiant energy is applied to the electrode 16 in any number of ways. For example, a suitable voltage may be applied prior to the application of the radiant energy and then removed subsequent to the trimming operation. Or, the application of voltage across the capacitor can be keyed to the power supply (not shown) for the device 12 so that as the device 12 is actuated to apply radiant energy to the electrode 16, the power supply 14 is actuated to apply a voltage across the capacitor 11.

It is difficult, if not impossible, to determine whether the application of a voltage across the capacitor while the capacitor is being trimmed prohibits the formation of shorts or clears any shorts which are formed before they become too large to be cleared without damage to the capacitor. In either event, it has been found that the application of a voltage across the capacitor while the capacitor is being trimmed results in a trimmed capacitor which is clear of any shorts formed due to the trimming operation. The terminology "inhibit the formation of shorts" as used herein denotes that the formation of shorts is either inhibited and/or the shorts are cleared prior to the shorts becoming too large to be cleared without damage to the capacitor.

As will be appreciated, the applied voltage must be sufficiently high to inhibit the formation of shorts but sufficiently low to avoid damage to the capacitor. It has been found, for example, that when wound capacitors are being trimmed, a suitable voltage level to apply across the capacitor is from 1 to 200 volts above the "burn-out" voltage. The "burn-out" voltage is the voltage normally used to clear those shorts which normally occur during winding of the capacitor. With thin-film capacitors, a voltage of from 10 to 10 percent of the anodization voltage is suitable. In other words, if the dielectric 18 is formed by anodizing the electrode 17 to a voltage of 100 volts, a voltage of from 10 to 20 volts is suitable for inhibiting the formation of shorts during trimming. In any event, the voltage level is not critical and can be selected by simple experimentation. For example, the voltage can be applied at a level just below that which will damage the capacitor, and a capacitor can be trimmed while incrementally reducing the voltage level across the capacitor until a voltage level is reached at which the formation of shorts is no longer inhibited. The voltage can then be set anywhere between these two voltage levels to obtain the desired results.

Figure 5:
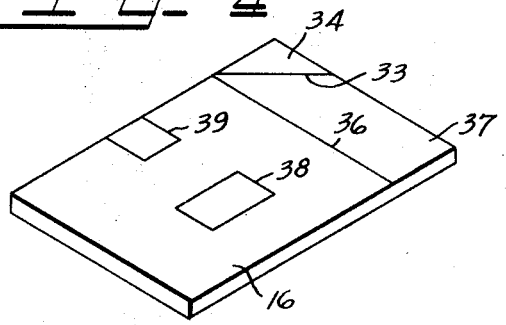
FIG. 5 is a sectional view of a typical thin-film capacitor.
Figure 5:
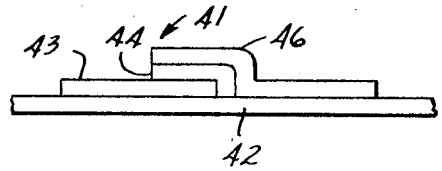

By way of example, the thin-film capacitor 41 illustrated in FIG. 5 can be trimmed with a neodymium doped, yttrium-aluminum-garnet, Q-switched laser using a 300 nanosecond pulse length at 500 watts peak power focused to a spot diameter of approximately 8 microns. The thin-film capacitor 41 is formed on a suitable substrate 42 and has a 5,000-angstrom thick tantalum electrode 43, a 3,000-angstrom thick tantalum pentoxide dielectric 44, a 3,000-angstrom thick gold electrode 46 and a capacitance of 0.01 microfarad. A DC voltage of 15 volts was found to be suitable for inhibiting the formation of shorts during the trimming of the capacitor 41.

Figure 6:
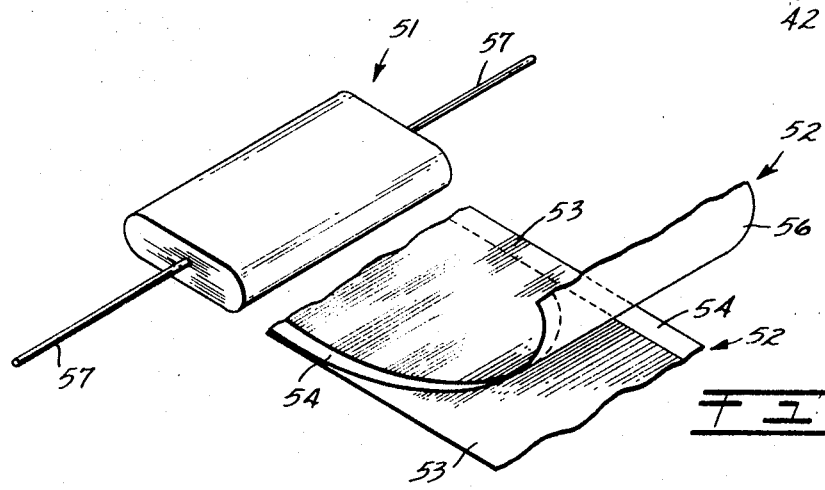
FIG. 6 is an isometric view of a typical wound capacitor.

Also by way of example, the wound capacitor 51 illustrated in FIG. 6 can be trimmed with a pulsed ruby laser using a 5 millisecond pulse length with a power output of 50 to 60 joules per pulse. The laser beam is focused to a circular pattern having a diameter of 10 millimeters with an Axicon conical lens. The wound capacitor 51 is formed by winding two 0.1 to 1.0-mil thick Mylar (trademark) tapes 52—52 together, each tape having a 500 to 600-angstrom thick zinc layer 53 thereon. The zinc layers 53—53 are formed across the width of the Mylar tapes 52—52 leaving a 1/16-inch zinc-free area 54 along one edge of the tape. The tapes 52—52 are wound with the Mylar side 56 of one tape facing the zinc layer 53 of the other tape and with the zinc-free areas 54—54 of the tapes on opposite sides. Sufficient tape is wound together to produce a capacitor having a capacitance of from 0.02 to 4.0 microfarads, and leads 57—57 are then attached to opposite sides of the capacitor 51. The zinc-free areas 54—54 permit the attachment of a lead to one electrode at one end of the capacitor without shorting the capacitor. The capacitor 51 is illustrated as if a portion of the tapes were unwound so as to facilitate the description of the capacitor. Normally, the last portion of the tapes 52—52 are completely zinc free so that the capacitor can be overwrapped with 30 layers or so of Mylar tape to insulate the capacitor. The Mylar can then be heat sealed to the body of the capacitor thereby terminating the wrapping operation. With a 0.03 microfarad capacitor of this type, an AC voltage of 1,400 volts is suitable for inhibiting the formation of shorts during the trimming of the capacitor. The applied laser beam electrically isolates a circular area from the capacitor approximately 50 layers deep.

What I claim is:

1. In an improved method of trimming a capacitor wherein radiant energy is applied to an electrode of said capacitor to selectively remove portions of said electrode and change the effective electrode area, the improvement comprising:

applying a voltage across said capacitor while said radiant energy is applied to said electrode said voltage being of such magnitude as to inhibit the formation of shorts during the application of said radiant energy but of insufficient magnitude to deleteriously affect the plates and dielectric of said capacitor.

2. A method of trimming a capacitor comprising:
applying a laser beam to an electrode of the capacitor to selectively remove portions of said electrode and change the effective electrode area, and
applying a voltage to said capacitor while said laser beam is applied to said electrode said voltage being of such magnitude as to inhibit the formation of shorts during the application of said laser beam but of insufficient magnitude to deleteriously affect the plates and dielectric of said capacitor.

3. The method of claim 2 wherein the step of applying the laser beam to the electrode includes focusing the laser beam to a spot.

4. The method of claim 3 wherein the focus of the laser beam is adjusted to control the diameter of the spot.

5. The method of claim 3 which includes the additional step of displacing the laser beam relative to the electrode to remove a controlled amount of said electrode.

6. The method of claim 5 wherein the laser beam is displaced across said electrode to electrically isolate a selected portion thereof.

7. The method of claim 2 wherein the step of applying the laser beam to the electrode includes focusing the laser beam to a line.

8. The method of claim 7 wherein the focus of the laser beam is adjusted to control the width of the line.

9 The difficult, of claim 7 which includes the additional step of displacing the laser beam relative to the electrode is remove a controlled amount of said electrode.

10. The method of claim 2 wherein the step of applying the laser beam includes focusing the laser beam to a perimeter-type pattern.

PO-1050
(5/69)

UNITED STATES PATENT OFFICE
CERTIFICATE OF CORRECTION

Patent No. 3,597,579          Dated August 3, 1971

Inventor(s)     R. M. Lumley

It is certified that error appears in the above-identified patent and that said Letters Patent are hereby corrected as shown below:

Column 4, line 14, "10 to 10 percent" should read --10 to 20 percent--.

Column 4, line 41, after "circular" insert --perimeter-type--.

Column 6, claim 9, delete "difficult," and insert --method--.

Column 6, claim 9, delete "is" and insert --to--.

Signed and sealed this 25th day of January 1972.

(SEAL)
Attest:

EDWARD M. FLETCHER, JR.
Attesting Officer

ROBERT GOTTSCHALK
Commissioner of Patents